United States Patent

Eckman

[11] Patent Number: 5,470,469
[45] Date of Patent: Nov. 28, 1995

[54] HOLLOW FIBER CARTRIDGE

[75] Inventor: Thomas J. Eckman, Hockessin, Del.

[73] Assignee: E. I. Du Pont de Nemours and Company, Wilmington, Del.

[21] Appl. No.: 305,948

[22] Filed: Sep. 16, 1994

[51] Int. Cl.$^6$ .................................................. B01D 63/00
[52] U.S. Cl. ..................... 210/321.8; 210/321.78; 210/321.79; 210/321.88; 210/321.89; 210/433.1; 210/335; 210/336; 210/450; 210/456; 210/500.23; 96/7; 96/8
[58] Field of Search ............... 210/321.78, 321.79, 210/321.8, 321.88, 321.89, 433.1, 446, 335, 336, 450, 323.1, 323.2, 500.23, 437, 456; 96/7, 8

[56] References Cited

U.S. PATENT DOCUMENTS

| | | | |
|---|---|---|---|
| 3,669,879 | 6/1972 | Berriman . | |
| 3,966,616 | 6/1976 | Bray | 210/450 |
| 3,979,190 | 9/1976 | Hedman . | |
| 4,080,296 | 3/1978 | Clark | 210/433.1 |
| 4,083,781 | 4/1978 | Conger . | |
| 4,265,763 | 5/1981 | Bollinger et al. | 210/323.2 |
| 4,293,419 | 10/1981 | Sekino et al. | 210/323.1 |
| 4,352,736 | 10/1982 | Ukai et al. . | |
| 4,358,377 | 11/1982 | Clark | 210/321.89 |
| 4,414,110 | 11/1983 | Geel et al. | 210/321.3 |
| 4,435,289 | 3/1984 | Breslau | 210/637 |
| 4,451,369 | 5/1984 | Sekino et al. | 210/336 |
| 4,622,143 | 11/1986 | Edwards | 210/439 |
| 4,670,145 | 6/1987 | Edwards . | |
| 4,675,109 | 6/1987 | Applegate et al. | 210/323.2 |
| 4,720,342 | 1/1988 | Takemura et al. | 210/321.79 |
| 4,775,471 | 10/1988 | Nagai et al. | 210/323.2 |
| 4,781,832 | 11/1988 | Takemura et al. | 210/321.8 |
| 4,871,379 | 10/1989 | Edwards . | |
| 4,876,012 | 10/1989 | Kopp et al. | 210/644 |
| 4,902,416 | 2/1990 | Schroeder et al. | 210/321.67 |
| 5,013,331 | 5/1991 | Edwards et al. . | |
| 5,013,437 | 5/1991 | Trimmer et al. | 210/321.79 |
| 5,039,413 | 8/1991 | Harwood et al. | 210/457 |
| 5,059,374 | 10/1991 | Krueger et al. | 204/156 |
| 5,071,552 | 12/1991 | Bikson et al. | 210/321.8 |
| 5,137,631 | 8/1992 | Eckman et al. | 210/321.8 |
| 5,174,900 | 12/1992 | Nichols et al. | 210/651 |
| 5,192,478 | 3/1993 | Caskey | 264/139 |
| 5,202,023 | 4/1993 | Trimmer et al. | 210/321.8 |
| 5,211,728 | 5/1993 | Trimmer | 210/321.89 |
| 5,221,473 | 6/1993 | Burrows | 210/232 |

Primary Examiner—Ana M. Fortuna

[57] ABSTRACT

A cartridge containing a plurality of hollow fiber membranes is disclosed. The cartridge comprises a plurality of fibers arranged in a bundle and at least one end of the bundle embedded in a tubesheet. The tubesheets are fitted with end caps to provide a chamber for the permeate. A feed tube extends longitudinally through the bundle and a permeate discharge tube is housed, preferably concentrically, within a feed tube. The cartridge does not require a high pressure seal, such as an O-ring seal, against the inner wall of the pressure vessel. The cartridge is configured as a single unit adapted for simple drop-in installation into a pressure vessel. Multiple cartridges may readily be inserted into a pressure vessel, and arranged so as to operate in series or in parallel. The hollow fiber membrane cartridge is adapted for industrial performance with high volumetric efficiency and high solute rejection. In addition, a process for installing the cartridges in a pressure vessel previously using spiral wound elements is disclosed.

7 Claims, 3 Drawing Sheets

HOLLOW FIBER CARTRIDGE

FIELD OF THE INVENTION

The present invention relates to improvements in fluid purification equipment, particularly of the reverse osmosis or ultrafiltration type. In particular, it relates to a fluid separation cartridge, particularly to a fluid separation cartridge using hollow fiber membranes having a selective permeability to fluid, particularly water. More particularly, it relates to a compact, unitary cartridge of hollow fiber membranes which readily enables multiple cartridges to be installed in a single pressure vessel, and may easily be installed in a pressure vessel, including a pressure vessel previously using spiral wound membranes. The cartridge is adapted for simplified installation and replacement on an as-needed periodic basic and is particularly useful for the purification and/or desalination of seawater, brackish water and wastewater.

BACKGROUND OF THE INVENTION

In this specification, the term "hollow fiber" refers to fibers of a generally tubular shape having a continuous passageway (or lumen) disposed substantially along the axial center line of the fiber. The term "membrane" refers to a porous or microporous material, typically a polymeric material, which may be in the shape of a hollow fiber or a film.

The term "spiral" or "spiral wound" refers to membranes or membrane separation devices wherein the membranes are in the form of an asymmetric film or thin film composite material which is wrapped compactly around a central support.

Hollow fiber bundles comprise a plurality of hollow, porous fibers which can be arranged in the shell or vessel. The hollow fiber membranes provide a large overall surface area for contact with the feed water.

A fluid separation apparatus comprises a pressure vessel which houses one or more bundles of membranes. The fluid separation apparatus separates fluids by using a membrane having a selective permeability and may be applied to various techniques such as gas permeation, liquid permeation, dialysis, softening, ultrafiltration, reverse osmosis, or the like. Recently, attention has been particularly given to the reverse osmosis which is especially effective for desalination and purification of sea water or brackish water, for recovering useful or harmful components from waste water or for reuse of water.

Fluid separation apparatuses are generally classified into flat membrane type, tubular type, spiral type and hollow fiber type according to the shape and form of the semipermeable membrane used therein. Among these, the hollow fiber type and the spiral type membranes are especially well known in the art, particularly for reverse osmosis separations, such as desalination of sea water or brackish water and purification of wastewater. In fluid separation apparatuses which incorporate spiral wound membranes, the membranes have a disadvantageously large spacing between the membranes, often ten to twenty times greater than the spacing for comparable hollow fiber membranes. Moreover, the pressure vessels used for spiral wound membranes tend to be very long in order to operate with desirably high feed flow rates, at high conversion and prevent disadvantageous concentration polarization. Pressure vessels for spiral wound membranes are known to be more than twenty feet long. The flow path for the fluid flowing on the reject side of the membrane and through the pressure vessel is, therefore, also very long, which requires the large spacing between membranes, so as to enable reasonable pressure drops across the length of the pressure vessel.

Hollow fiber fluid separation apparatuses solve most of these problems associated with spiral wound fluid separation apparatuses. For example, the flow paths for the fluid on the reject side of the membrane are relatively short, the radial flow path is short and the pressure drop across the bundle and down the annulus along the length of the device is not excessive. In addition, the spacing between hollow fiber membranes is typically small (generally about 25 microns vs. 25 mils for spiral wound membranes). As a result, a hollow fiber type apparatus has very high membrane separation efficiency per unit volume of the apparatus. Hollow fiber membranes are particularly suited for reverse osmosis separations.

The use of the reverse osmosis membrane inherently requires appropriate membrane housing and associated plumbing connections to handle three separate water flows. Specifically, the membrane housing and plumbing connections must accommodate connection of the feed fluid to the membrane, as well as flow of the purified (permeate) and reject (residue) fluids from the membrane. In the past, spiral reverse osmosis membranes have been provided in a cartridge form with a view toward facilitated cartridge replacement on a periodic basis, but prior reverse osmosis systems have not provided any optimally simplified cartridges, especially hollow fiber cartridges, for quickly and easily installing and removing the cartridge in a substantially fail-safe, error-free manner.

The reverse osmosis is usually carried out by treating a fluid under pressure higher than the osmotic pressure of the fluid, by which the components of fluid are separated via a membrane having a selective permeability. The feed pressure may vary with the kinds of fluids to be treated, the properties of the selectively permeable membranes, or the like, but is usually in the range from 10 to 1000 psig for spiral wound membranes and from 40 to 2,000 psig for hollow fiber membranes.

The prior art describes hollow fiber membrane type fluid separation apparatuses where at least one pair of hollow fiber bundles are contained within a vessel; however, fluid separation apparatuses housing multiple hollow fiber bundles, especially more than two bundles, are not well known in practice. These devices may require complicated hardware and the fluid to be treated is separated by bundles typically in series, thereby disadvantageously reducing the volumetric efficiency of the apparatus. The hardware typically includes at least two O-rings at each end of the bundle of hollow fiber membranes. The O-rings form a seal between the outside of the bundle and the inner surface of the pressure vessel. The O-rings serve to hold the bundle in place within the pressure vessel and to seal various fluid streams from each other during operation of the device. The O-ring seals and the complicated hardware makes it difficult to install or replace the hollow fiber bundles in the pressure vessel.

It is also known that failure of the hollow fiber membranes may necessitate prompt replacement of a bundle. For example, the fibers are fragile and may be easily damaged during transport, handling, assembly and operation of the fluid separation apparatus; as soon as fibers break or develop a fault, it may be necessary to replace the bundle of hollow fibers. Moreover, repair of damaged fiber is not economic. Therefore, it is highly advantageous that the hollow fiber bundles be readily installed and replaceable within the pressure vessel. However, as noted above, typically hollow fiber bundles use O-rings at the vessel inner diameter to seal the low pressure permeate from the high pressure feed fluid. This is achieved with a series of O-rings at each end of the bundle. The O-ring/bundle assembly must then be inserted with considerable mechanical force into the pressure vessel. Fiber bundle inspection and replacement is, as a consequence, difficult.

Existing designs have many other disadvantages. For example, in many applications (such as shipboard or portable use) the maximum possible area of membrane must be contained in the smallest possible volume and it is desirable to have greater flow per unit volume of the device. Pressure vessels which house only one bundle of hollow fiber membranes require excessive external piping which is costly to install and takes up space.

There is also a need for compact transportable equipment for mobile or military use. There is also a need that such equipment be at least partially assembled during transport and that it be easy to complete the assembly for rapid use in the field.

Furthermore, it is desirable to have a range of sizes and dimensions of hollow fiber bundles made available for different applications. Varying feedstocks to be treated contain different amounts of impurities and for economy, those with few impurities should be treated at high flux rates through the membrane. Long cartridges containing fine hollow fibers are not able to provide a high velocity of drawoff of permeate because of the hydraulic pressure drop of flow in the narrow lumens of the fibers and hence short cartridges are required. Conversely, some feeds require longer cartridges where the lower membrane flux rates present no problems of lumen pressure drop.

Another problem with prior art designs arises because different types and batches of fibers have different quality in terms of initial defects or service failure rates per unit of fiber surface area. There is also a risk of construction defects. It is, therefore, desirable to periodically test or inspect the membranes, which necessitates installing and removing numerous bundles from pressure vessels.

The testing of bundles for defects also presents problems. Bundles, especially spiral wound bundles, are typically tested for failure by means of a bubble pressure test. Existing hollow fiber bundles must be installed into a pressure vessel for such testing. During testing, when water occupies all of the pores in the membrane, a certain pressure, known as the bubble point of the membrane, has to be exceeded to overcome the interfacial tension of the water in the pores. In the bubble pressure test, air is forced back into the lumens of the wetted fiber. Failed fibers allow air to pass through the fiber walls at a pressure lower than the bubble point of the membrane. The opacity of prior art pressure vessels does not allow visual detection of a failed hollow fiber. This problem further magnifies the need for a hollow fiber bundle cartridge which may be readily installed into and removed from the pressure vessel and a hollow fiber cartridge which may be tested without installing it into a pressure vessel.

It is also desirable to have a hollow fiber membrane cartridge which may be readily installed in a pressure vessel which previously housed hollow fiber bundles or spiral wound elements. Unfortunately, in typical spiral wound devices the permeate fluid is discharged from a center tube. In typical hollow fiber devices the feed fluid is introduced through a center tube and the permeate fluid is discharged through another opening in the pressure vessel. Therefore, to retrofit an existing spiral wound bundle with a prior art hollow fiber bundle, it is necessary to use complicated pipes or fittings to "reverse" the flows of the feed fluid and the permeate fluid from the respective ports.

The present invention provides a hollow fiber membrane cartridge which keeps the advantages of the prior art and multiple cartridges may readily be installed in and removed from a pressure vessel. The cartridge is particularly suitable for use in pressure vessels that previously housed spiral wound elements. The inventive cartridge is a simple, economical device. The flow paths, are designed so that the permeate discharges through a center tube, which facilitates the installation of the inventive cartridges in a pressure vessel that previously housed spiral wound elements. Each cartridge is equipped with a tubesheet having individual pressure end caps which may be connected to appropriate ports or fittings to deliver the permeate fluid or the residue fluid and/or for making external fluid connections to other cartridges. These cartridges can be manufactured so that economy, convenience and utility can be optimized by varying the number of fibers per cartridge. These objectives, as well as other objects, features and advantages of the present invention, will become apparent to those skilled in the art from the following description.

SUMMARY OF THE INVENTION

The present invention is a simple, efficient, low-cost cartridge which contains a plurality of hollow fiber membranes. Multiple cartridges may readily be installed in a single pressure vessel and during assembly the cartridges are readily installed in and removed from a pressure vessel; the cartridge is configured as a single unit adapted for simple drop-in installation into an open-ended pressure vessel. The term cartridge refers to a device comprising a bundle of hollow fiber membranes, having at least one tubesheet, end caps and internal piping, all as more fully described herein. The center of each cartridge has a feed tube extending substantially from one end to the other. A permeate discharge tube is housed, preferably concentrically housed, within the feed tube. A tubesheet is provided at, at least one end of each hollow fiber bundle, the lumens of the hollow fibers being opened into the tubesheet. Each tubesheet has pressure end caps sealed thereto. The end cap and the adjacent tubesheet define a space for collection of the permeate fluid. The space is in fluid communication with the internally housed permeate discharge tube. The end caps are securely engaged with the tubesheet so as to confine the low pressure permeate fluid within the cartridge. The end caps are equipped with fittings and/or ports to deliver the permeate fluid or the residue fluid. Such fittings and/or ports also permit the cartridge to be connected, in series or in parallel, to other cartridges. The cartridges optionally have seals attached thereto, such as lip seals at the feed end of the bundle, so as to facilitate installation of the cartridge in a pressure vessel. One or more cartridges may be installed in a single pressure vessel. The pressure vessel is typically cylindrical with end plates that are sealed to form a container.

Another embodiment of the present invention is that multiple fluid separation apparatuses, each containing a plurality of bundles, may readily be connected in series to increase conversion at a given of feed flow. Multiple cartridges may be removably arranged longitudinally end-to-end in series by connecting the concentrically housed permeate discharge tubes for each adjoining cartridge, allowing the collection of permeate fluid from each subsequent bundle to be discharged in the tube that is concentrically housed in the feed tube. In addition, the annular spaces of each hollow fiber bundle are preferably in fluid communication with the central feed tube in the next successive cartridge. Optionally, some of the feed fluid may bypass a cartridge by having an orifice in, for example, the end cap, which permits some of the feed fluid to bypass each cartridge. If pressure drop across a bundle is too large, then the orifice may be adjusted to regulate the pressure drop and to optimize flow characteristics and conversion in the bundle. The bypass of feed fluid is especially useful when multiple hollow fiber bundles are stacked in large pressure vessels. The residue fluid from the last cartridge is ultimately collected and discharged through a common port.

The flow of the fluids through the apparatus is typically so-called "inside-out" flow (although "outside-in" flow is also possible). The feed fluid passes into the fluid separation apparatus containing one or more cartridges through a central feed tube. The feed fluid is distributed to the first cartridge through distributing holes or perforations in the feed tube. The hollow fiber membranes are selective to one or more of the fluids, so such fluids will pass into the permeable fibers much more quickly than the other fluids. The permeate flows through the bores of the hollow fibers to a tubesheet and is collected at one or more ends of the fiber bundles, and then flows into a tube which is housed within the feed tube where it may be combined with permeate from other bundles, further treated or is discharged from the apparatus at either end. In summary, feed fluid generally travels through all bundles in the same pattern; i.e., radially outward from the feed tube into the hollow fibers, selectively permeating the hollow fibers. The permeate then exits the hollow fibers at open ends. The permeate from all of the cartridges in the pressure vessel is then removed from the fluid separation apparatus at one or both ends of the apparatus. The amount of permeate removed is a function of the properties of the hollow fiber, feed temperature, the composition of the feed fluid, the feed to permeate pressure differential and the flow rate of the feed fluid.

The residue fluid is extracted simultaneously from all bundles by flowing radially outward through the bundles; the residue fluid does not readily permeate the hollow fiber membranes. The residue fluid is then collected in the annular space in between the hollow fiber bundle and the pressure vessel. The residue may then be combined with the bypass feed of the upstream cartridge. This combined stream may then become the feed for the next cartridge. The annular spaces around the respective cartridges may be also in fluid communication with each other. The residue fluid is ultimately discharged from the fluid separation apparatus.

The inside-out flow scheme of the cartridge reduces the likelihood of nestling of the hollow fiber membranes. When the feed fluid is introduced to the outside of the hollow fiber bundle, flowing inward to the center, there is a tendency for the hollow fibers to nestle. This effect results in increased bundle pressure drop with accompanying reduction in permeate flow. The likelihood of fouling is also increased as fibers press more closely together.

The cartridge is adapted for quick and easy drop-in or slide-in installation into a pressure vessel. In particular, the cartridges may readily be installed in a pressure vessel that previously housed spiral wound elements or hollow fiber bundles. The spiral wound elements or hollow fiber bundles may, for example, be replaced using the following method:
1. Open one or both of the end plates of the pressure vessel.
2. Remove the spiral wound elements. This may be accomplished by any method known in the art. In practice, the spiral wound elements or hollow fiber bundles are pushed out of one end of the pressure vessel by pushing the replacement cartridge or cartridges into the other end. Because prior art hollow fiber bundles form a pressure-tight seal with the inside wall of the pressure vessel, removal of such bundles may not be trivial.
3. One or more hollow fiber membrane cartridges are then inserted into the pressure vessel. The cartridges may be specifically configured to fit within the pressure vessel. Alternately, so-called spacers may be added to ensure that the cartridges fit securely longitudinally within the length of the pressure vessel and/or circumferentially within the inner circumference of the pressure vessel.
4. The cartridges are connected by appropriate fittings. The feed fluid is in communication with the center feed tube. The permeate is discharged through a port, typically a port located in the center of one or both of the end plates of the pressure vessel, which is in fluid communication with the concentrically housed discharge tube. The second end of the last cartridge is fitted such that the residue fluid port is in communication with the annular spaces around the cartridge. It is not necessary to use specialized piping or fittings in order to "reverse" the flow of the feed fluid and the residual fluid.

The inventive cartridge facilitates the objects of the present invention. The fluid-separation apparatus may use any number of cartridges aligned in series or in parallel in a single pressure vessel. The cartridges may readily be installed into and removed from most conventional pressure vessels. The piping and fittings required to assemble multiple cartridges in a pressure vessel is minimal. External piping and porting around the apparatus are minimal resulting in the use of less space, greater durability and lower installation costs for the end user. More important, existing pressure vessels for traditional spiral wound permeators may readily be retrofitted with the inventive cartridge, thereby reducing the cost of replacing spiral wound bundles with hollow fiber bundles. Moreover, the cartridge of the present invention retains the advantageous features of the prior art.

BRIEF DESCRIPTION OF THE DRAWINGS

The hollow fiber membrane cartridge of the present invention will be illustrated in more detail with reference to the following accompanying drawings.

DETAILED DESCRIPTION OF THE INVENTION

Figure 1:
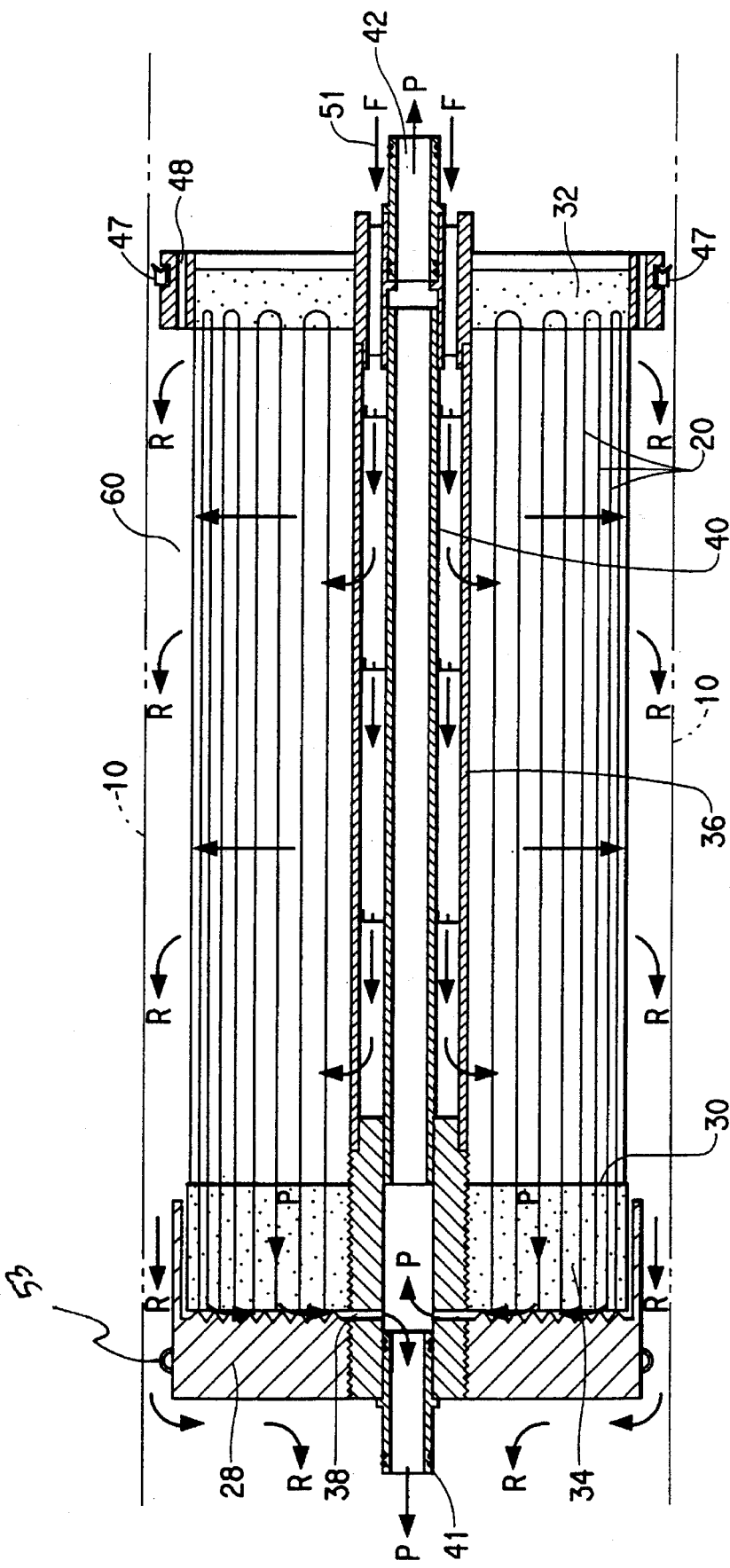
FIG. 1 is a cross-sectional view of a single hollow fiber cartridge having a tubesheet at one end, contained within a pressure vessel.

FIG. 1 shows the hollow fiber cartridge of the present invention within a pressure vessel. In the Figures, "F" denotes the feed fluid, "P" denotes the permeate fluid and "R" denotes the residue or reject fluid. The cartridge is inserted into a pressure vessel, preferably an elongated cylindrical pressure vessel which may be enclosed by end caps (not shown). The inner walls of the vessel are designated 10. There is a tubesheet 30, at one end of the bundle of hollow fibers 20, where the fibers are joined or sealed with epoxy 34 and are cut back to expose the bores of the hollow fibers to fluid communication through the bundles. The cross-sectional configuration, (i.e., the configurations lying in a plane perpendicular to the longitudinal orientation of the hollow fiber membranes) of tubesheet is usually generally circular. It is also apparent that the cross-sectional configuration may be in any other form such as triangular, tribal, square, rectangular, trapezoidal, pentagonal, hexagonal, free form, or the like. The maximum cross-sectional dimension of the tubesheet may also vary substantially. The face of the tubesheet may be any suitable configuration and is generally substantially the same configuration as the cross-sectional configuration of the tubesheet. The face may be substantially flat or may be curved or irregular in surface contour. The tubesheet may contain one or more bundles of hollow fiber membranes, preferably one bundle.

The other end of the bundle is sealed with an epoxy 32 so as to create a fluid-tight seal.

The center of the cartridge contains a feed tube, 36, extending substantially from one end of the bundle to the other. Feed tube, 36, has holes or perforations bored in the wall of the feed tube so as to allow the feed fluid to radially flow into the bundle of hollow fiber membranes. The size, location and configuration of the openings is not critical; however, the openings preferably should facilitate uniform radial flow of the feed fluid into the bundle. The openings are preferably circular holes with a diameter of 0.1 cm to 2.0 cm.

An end cap 28 is shown in a sliding engagement with the tubesheet 30. The end cap 28 may be securely sealed to the adjacent tubesheet 30 by any number of means known in the art. In practice, the end cap is sealed to the tubesheet and/or the bundle with epoxy. The end cap may be fabricated from any suitable material, but it is preferably made from plastic so that it may be molded into the desired configuration. The desired openings and orifices may be cut or bored into the end cap before or after attaching it to the tubesheet and/or bundle. The tubesheet and end cap may also be engaged in a threaded connection or any other suitable connection, instead of the sliding one shown. In addition, the end cap may be sealed to the circumference of the tubesheet by epoxy or any suitable means, so as to define a permeate collection space 38 which is at relatively low pressure during operation. The permeate collection space 38 is in fluid communication with the permeate discharge tube 40 which is housed inside the feed tube 36. The permeate discharge tube 40 may then be in fluid communication with adjacent cartridges or a discharge port through suitable sections, 41 and 42. The cartridge is fitted within the pressure vessel 10 so as to form space 60. The pressure vessel is not a part of the inventive cartridge, but is illustrated simply to show the relationship of the cartridge and the respective fluid streams during operation. The residue or reject fluid is collected in space 60, which is typically an annular space.

The permeate collection space 38 is at low pressure compared to the pressure of the feed fluid. The end cap and the seal between the end cap and the adjacent tubesheet and/or bundle must be sufficiently strong to resist the pressure differentials within the cartridge. For example, the pressure of the feed fluid may be about 1200 psig. The pressure of the residue fluid in the annular space 60 surrounding the bundle may be about 1180 psig. The pressure of the permeate fluid in the permeate collection space 38 may be about 20 psig.

The inventive cartridge with the end cap/permeate collection space/internally housed permeate discharge tube configuration, therefore, eliminates the need for a tubesheet O-ring or other similar seal which seals against the inner wall of the pressure vessel and seals the high pressure residue from the low pressure permeate.

The end cap may also be configured to maintain the appropriate spacing in the annular space; i.e., between the outer diameter of the bundle and the inner diameter of the bundle. In FIG. 1, the end cap 28 has a spacer 53, which may be of any suitable design or configuration. The spacer 53 firmly holds the cartridge, preferably concentrically, within the pressure vessel, but permits residue fluid to flow from the annular space 60 to the next cartridge and/or be discharged from the fluid separation apparatus.

Feed pipe 36 and permeate discharge pipe 40 as well as fittings 41 and 42 may be made of plastic material such as nylon, glass-reinforced plastic polyvinylchloride, fiber-reinforced epoxy resin; or metals such as stainless steel; carbon steel, or titanium. The dimensions thereof such as thickness, diameter and length are not specified and may be altered to achieve the desired function. The flexibility in choice of construction allows the selection of a corrosion resistant manufacturing material for the cartridge for a particular application. The materials of constructions may, for example, be chosen to resist high temperatures.

In an alternate version, the end cap 28 may be shaped to facilitate stacking of the cartridges one on the other. The end cap at feed end of bundle may also incorporate an orifice 48 or a flow control valve that can restrict the fluid communication between cartridges. When cartridges are operating in series, such an orifice or a valve may be used to restrict flow out of one cartridge and, therefore to bypass flow to the fiber bores of the adjoining cartridge. This makes possible trimming of the flow through individual fiber bundles of a multi-bundle permeator assembly so the purity of each bundle cartridge in an assembly can be balanced with other cartridges.

A support block may optionally be situated adjacent to the face of the tubesheet. Seal 47 serves to prevent leaks between different compartments of the permeator by isolating the water flows from each other. Seals, such as O-rings are not preferred because the O-rings make the cartridge extremely difficult to install into the pressure vessel. When the cartridge is installed into the pressure vessel, the seals are preferably so-called lip seals which utilize the upstream fluid pressure to force the seal against the wall. Thus, when the pressure is relieved the seal fits loosely against the wall of the vessel and the cartridge is easily removed. The seal 47 serves to seal the annular chamber 60 so that high pressure feed fluid does not leak and mix with the residue. As the bundles expand and contract or shift slightly with different operating conditions, the seal 47 can slide axially while maintaining a seal. The lip seals permit simple slide-in installation of the cartridge into the pressure vessel. In the present invention, the lip seal is used at the feed end of the cartridge.

Lip seals are generally known for use with spiral wound elements, primarily because the pressure differentials of the fluids in a spiral wound element are relatively small. The lip seal typically will withstand pressure differentials of up to 50 psig, which is satisfactory for most spiral wound elements and not satisfactory for most hollow fiber cartridges. The configuration of the present hollow fiber cartridge eliminates the need for a seal which must withstand a large pressure differential.

In the present embodiment, the permeate discharge tube 40 is concentrically housed with the feed tube; however, the size, configuration and location of the discharge tube 40, are not important as long as they can accommodate the flow of permeate fluid. This assembly allows simple assembly of multiple cartridges by simply inserting section 41 in between the facing ends of another cartridge so as to effect fluid communication between the permeate discharge tube of the first cartridge and the feed tube of the second cartridge.

Port 51 provides means for external fluid communication for the feed fluid. Sections 41 and 42 provide external fluid communication for the permeate or product fluid. Sections 41 and 42 are preferably removable, so that they may be readily replaced with substitute fittings that are suitable in size, shape and configuration for the particular pressure vessel in which the cartridge will be installed.

Figure 2:
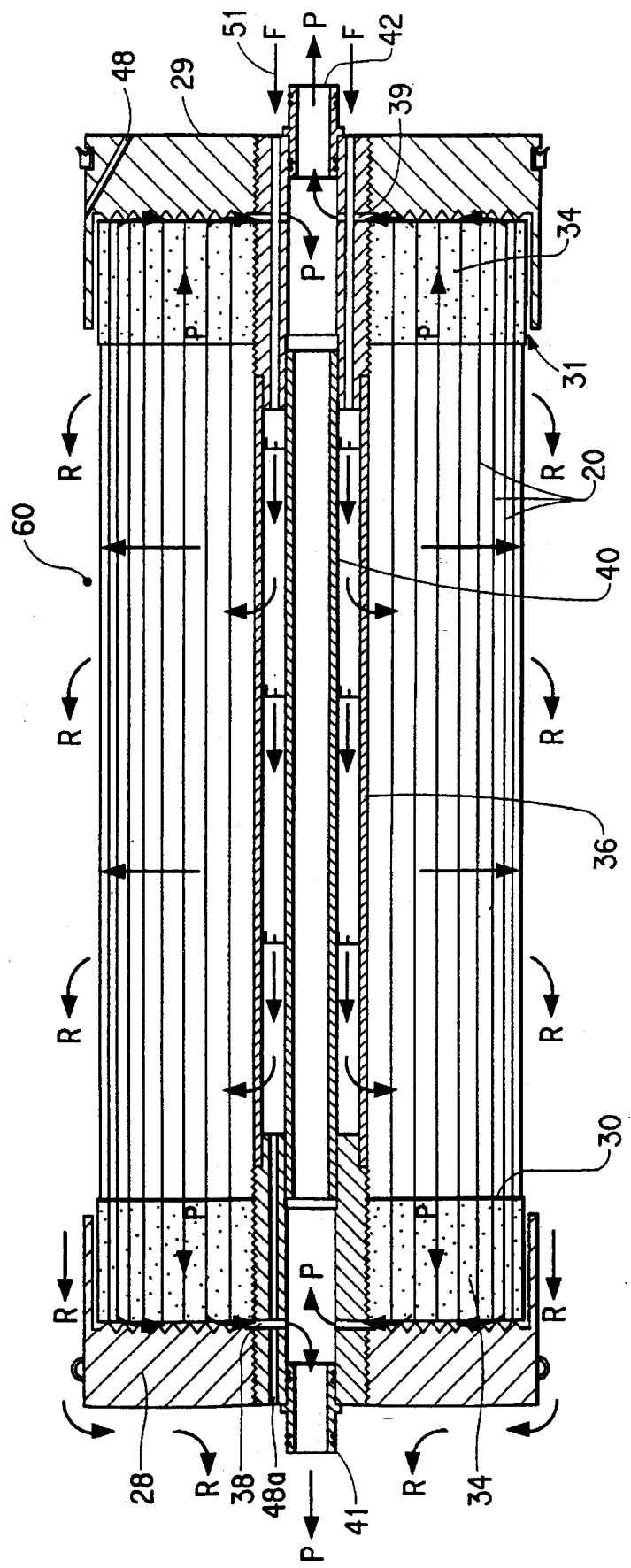
FIG. 2 is a cross-sectional view of a single hollow fiber cartridge having tubesheets at both ends of the bundle, contained within a pressure vessel.

The cartridge optionally has a channel or an orifice 48 or a flow control which permits bypass, preferably controlled bypass, of feed fluid to space 60. The orifice 48 may be situated in the end cap or any other convenient location, so as to permit fluid communication between some of the feed fluid and the residue fluid. For example, as shown in FIG. 2, an orifice or channel 48A may extend through the end cap so as to permit fluid communication between the feed fluid and the residue fluid outside of the end cap. Bypass of some of the feed fluid is particularly useful when multiple cartridges are operated in series. The bypass of feed fluid prevents excessive pressure differentials between the feed fluid and the residue fluid, which is a particular concern for the first several cartridges in a multicartridge system. Accordingly, the use of the orifice to bypass feed fluid facilitates the use of the lip seal. Moreover, the bypass of feed fluid may facilitate optimization of the flow characteristics and conversion of the successive cartridges.

The embodiment of the invention shown in FIG. 1 is particularly suitable for the purification of sea water, brackish water or waste water. The flow of the respective fluids through the fluid separation apparatus can readily be demonstrated by describing the purification of salt water, as follows: Still referring to FIG. 1, salt water is fed into port 51, into the central feed tube 36 where it is simultaneously radially distributed through the openings in the feed tube to the membranes 20 of the hollow fiber bundle. The hollow fiber membranes are selective to one or more of the fluids, so such fluid will pass the permeable fibers more quickly than the other fluids. In this case, the hollow fiber membranes are selectively permeable to fresh water. The product water, or the permeate, flows through the center of each hollow fiber and is collected at the tubesheet 30 end of the hollow fiber bundle in the permeate collection space 38, which is defined by the end plate 28 and the face of tubesheet 30. In summary, feed fluid generally travels through all bundles of hollow fiber membranes in the same pattern; i.e., radially from the feed tube into the hollow fibers, selectively permeating the hollow fibers. The permeate then exits the hollow fibers at the open ends adjacent to both end plates. The permeate is then fed to the adjoining bundle of hollow fibers. The amount and purity of permeate removed is a function of the properties of the hollow fiber, the feed temperature, the composition of the feed fluid, the feed to permeate pressure differential, and the flow rate of the feed fluid.

The residual salt water flows radially outward through the bundle of hollow fiber membranes. The residual salt water is then collected in the annular space 60 adjacent to the wall of the pressure vessel 10 and thereafter flows longitudinally to the tubesheet end of the bundle and around the end cap where it may be collected. The residue fluid can be combined with the bypass from the first cartridge and then fed into the next cartridge or discharged from the pressure vessel.

The present invention facilitates inside-out flow of the fluid to be treated, although the cartridge may also be used for so-called "outside-in" flow. The "inside-out" flow has certain advantages. In particular, the fluid separation is usually operated at high pressure, ranging from 10 to 2,000 psig. When the fluid flows at high pressure from the outside of the bundle inward, the fibers tend to nestle together, thereby resulting in non-uniform flow of the feed fluid radially through the bundle and an increase in the pressure drop radially through the bundle, along with an accompanying reduction in permeate flow. In addition to the increased pressure drop, it is believed that the feed fluid cannot uniformly access the outer surface of each hollow fiber, thereby reducing the overall effectiveness of the bundle and increasing the possibility of fouling. Inside-out flow of the fluid to be treated significantly reduces the likelihood of nestling of fibers.

FIG. 2 is a cross-sectional view of a cartridge with a so-called double-ended bundle, which has tubesheets on both ends of the hollow fiber bundle.

This embodiment comprises tubesheets 30 and 31, at both ends of the bundle of hollow fibers 20, where the fibers are joined or sealed with epoxy 34 and are cut back to expose the bores of the hollow fibers to fluid communication through the bundles.

The center of the cartridge contains a feed tube 36 extending substantially from one end of the bundle to the other. Feed tube 36 has holes or perforations bored in the wall of the feed tube so as to allow the feed fluid to radially flow into the bundle of hollow fiber membranes.

End caps 28 and 29 are shown in a sliding engagement with the tubesheet. In practice, the end cap is sealed to the tubesheet and/or the bundle with epoxy. The end caps may be sealed to the circumference of the tubesheet by epoxy or any suitable means, so as to define low pressure permeate collection spaces 38 and 39. The permeate collection spaces 38 and 39 are in fluid communication with the permeate discharge tube 40 which is housed inside the feed tube 36. The permeate discharge tube 40 may then be in fluid communication with adjacent cartridges or a discharge port through suitable sections, 41 and 42. The cartridge is fitted within the pressure vessel (not shown) so as to form space 60. The residue or reject fluid is collected in space 60, which is typically an annular space.

Port 51 provides means for external fluid communication for the feed fluid. Sections 41 and 42 provide external fluid communication for the permeate or product fluid.

Figure 3:
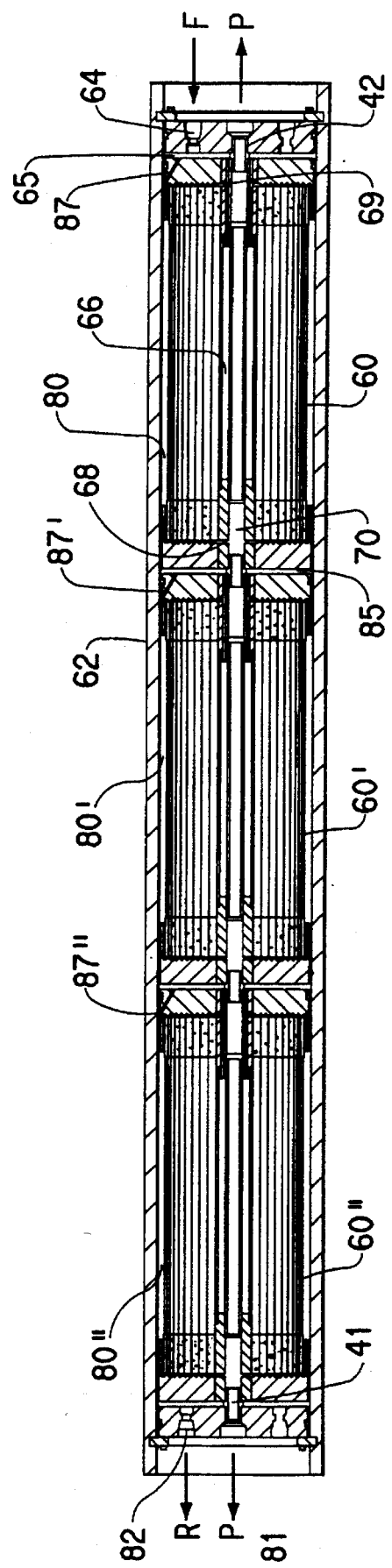
FIG. 3 is a schematic cross-sectional view of a second embodiment of the invention wherein three hollow fiber membrane cartridges are contained in the pressure vessel.

As shown in FIG. 3, a fluid separation apparatus may be adapted to hold a plurality of the cartridges of the present invention. The number of hollow fiber cartridges to be contained in a fluid-separation apparatus may be varied after taking into consideration the size of the pressure vessel, overall pressure loss in flow of fluid within the apparatus and performance of hollow fibers at a high flow speed in the assembly. The number of hollow fiber cartridges is usually in the range of two to ten, preferably two to four.

FIG. 3 shows a fluid separation apparatus where three hollow fiber cartridges are used. The fluid separation apparatus has three hollow fiber bundles in one pressure vessel. The fluid separation apparatus has three hollow fiber cartridges designated as 60, 60, and 60" in a single pressure vessel 62. The cartridges may be the same or different. The fluid to be treated is supplied via port 64 into cavity 65 which is in fluid communication with center feed tube 66. The feed fluid is distributed to the first hollow fiber bundle 60 via openings in the feed tube 66. The fluid which permeates the hollow fiber membranes is collected in the space designated as 68 which is in fluid communication with permeated discharge robe 70. The residue fluid does not readily permeate the hollow fiber membranes and flows into the annular spaces 80, 80' and 80" in between each hollow fiber bundle and the pressure vessel 62. The residue or reject fluid is collected in annular space 80 which is in fluid communication with space 85 which is between the facing end caps of adjacent cartridges. The residue then flows to the second cartridge 60', where it becomes the feed fluid. The permeate fluid follows the same path through the second and third cartridges 60' and 60" and is discharged from the pressure vessel via port 81. Thereafter, the residue fluid from all of the cartridges is discharged from the pressure vessel via port 82. The cartridges optionally comprise an orifice, preferably in the end cap, which permits fluid communication between the feed fluid for each respective bundle and the residue fluid for the bundle. The orifice is shown in FIG. 3 as 87 and 87'. The bypass of feed fluid facilitates the balancing of the concentration of residue in the feed fluids for the respective cartridges. In effect, the multiple cartridges are operating partially in parallel and partially in series.

To assemble the device, the fiber cartridges are first individually assembled, then the cartridges may be inserted one by one. As each cartridge is inserted into the pressure vessel it is connected to the next cartridge by suitable piping. Alternately, each bundle may first be connected to each other by suitable piping. When all cartridges are assembled and connected, end fitting 41 engages the port 81 at the far end of the pressure vessel casing. The length and configuration of fittings 41 and/or 42 may be adjusted to ensure that the cartridges securely fit within the pressure vessel housing. For replacement of the fiber bundles or servicing, the fiber bundles can be removed by reversing the assembly procedure.

The cartridges may also readily be used to replace spiral wound bundles in a pressure vessel. In operation, the spiral wound bundles typically employ straight plug flow of the fluid to be treated. In particular, the fluid to be treated enters the pressure vessel. The feed fluid flows straight through the bundle through the brine channels of each cartridge. The spiral wound membranes are selective to one or more fluids which permeate through the membrane and are ultimately collected in the product channel between the two sides of the flat membrane. The permeate flows spirally inward and communicates to a center product tube. The residue fluid does not permeate through the spiral wound membrane and flows through wide reject channels and out the opposite end of the permeator.

As noted above, hollow fiber membranes perform more advantageously than spiral wound membranes for many applications. The spiral wound elements or existing hollow fiber bundles may be replaced with hollow fiber cartridges as follows:

1. Open one or both of the end plates of the pressure vessel.
2. Remove the spiral wound bundles. This may be accomplished by any method known in the art. In practice the spiral wound element or hollow fiber bundles are pushed out of one end of the pressure vessel by pushing the replacement cartridge or cartridges into the other end. Because prior art hollow fiber bundles form a pressure-tight seal with the inside wall of the pressure vessel, removal of such bundles may not be trivial. It is often necessary to use hydraulic equipment to force the hollow fiber bundle out of the pressure vessel.
3. One or more hollow fiber membrane cartridges are then inserted into the pressure vessel. The cartridges may be specifically configured to fit within the pressure vessel. Alternately, so-called spacers may be added to ensure that the cartridges fit securely longitudinally within the length of the pressure vessel and/or circumferentially within the inner circumference of the pressure vessel.
4. The cartridges are connected by appropriate fittings. The feed fluid is in communication with the center feed tube. The permeate is discharged through a port, typically a port located in the center of one or both the end plates of the pressure vessel, which is in fluid communication with the concentrically housed discharge tube. The reject port of the pressure vessel is in communication with the annular spaces around the last cartridge.

The hollow fiber membranes may be of any convenient configuration, e.g., circular, hexagonal, trilobal, or the like in cross-section and may have ridges, grooves, or the like extending inwardly or outwardly from the walls of the hollow fiber membranes. The hollow fiber membranes are useful in fluid separations, i.e., they may serve as the support for coating which provides selective separation or as the medium which affects the separation. The hollow fibers used in the present invention include all fibers having an inner diameter of about 20 microns to about 200 microns, preferably about 40 microns, and a hollow ratio (being the area of the fiber bore divided by the area of the total cross-section of the fiber) of about 10% to about 50% percent, preferably about 20%. The dimensions of the fibers and hollow ratio, as well as the dimensions of the pressure vessel, are dependent in part on the operating pressure. In general, the hollow fibers must have a thicker wall, resulting in a lower hollow ratio, for higher operating pressures. The membranes may be fabricated from various polymers such as cellulose, cellulose esters, cellulose ethers, polyamides, silicone resins, polyurethane resins, unsaturated polyester resins or the like, or ceramics.

The potting material to form the tubesheet may be comprised of any suitable material. Preferably the potting material can be in liquid form when preparing the tubesheet and can thereafter be solidified, e.g., by cooling, curing, or the like. The solidified potting material should exhibit sufficient structural strength for providing a tubesheet and be relatively inert moieties to which it will be exposed during fluid separation operation. The potting material may be organic, preferably epoxy, or inorganic or organic containing inorganic material, and the potting material may be natural or synthetic. Typical inorganic materials include glasses, ceramics, cermets, metals and the like.

The pressure vessel used in the present invention is preferably a cylindrical vessel having an inner diameter of 5 cm. to 50 cm., most preferably about 25 cm., but the shape of the pressure vessel is not necessarily restricted. The thickness of the wall of the pressure vessel must be adapted to the specific operation conditions, particularly to operate safely at the operating pressure.

The rugged construction of the cartridges enables them to be transported over rough terrain or delivered by helicopter into difficult sites. The only pipework needed is at each end of the pressure vessel. The cartridge is lightweight and also provides versatility of shapes, dimensions and configurations. Cartridges of differing and variable dimensions can easily be interchanged. Thus adjustment of cartridges for different feedstock properties or to accommodate different pressure vessel is possible. Insertion of the cartridge into the pressure vessel is made easy because the cartridge comprises a sealing means, preferably a simple lip seal.

It is advantageous that multiple cartridges may be installed in a single pressure vessel. Moreover, one basic cartridge size can be joined to other cartridges in as simple assembly to provide any size fluid separation apparatus. Only a single pressure vessel is needed for each assembly of cartridges thus reducing cost of assembly, the cost of multiple pressure vessels, the cost of external piping and the cost of racks to hold a multitude of fluid separation apparatuses, ultimately reducing the cost per volume of permeate. In the assemblies using cartridges with the shaped end caps, the piping may be further simplified for any number of cartridges in an assembly.

The cartridges of the present invention may also be advantageously tested for leaks. The cartridge may be tested for leaks without installing it in a pressure vessel. In particular, a bubble pressure test may be conducted on the cartridge, wherein the permeate discharge tube is filled with air and the end is plugged. The hollow fibers are then immersed in water and the bores of the hollow fibers are exposed to slight air pressure. Failed fibers allow air to pass through the fiber walls at a pressure lower than the bubble point of the membrane. The cartridge is observed to ascertain whether air bubbles appear in the water. It is also possible to discern, from the location of the air bubbles, to distinguish whether the leak is from the tubesheet or the hollow fibers. The cartridges may also be readily removed from a pressure vessel for periodic bubble testing.

The fluid separation apparatus of the present invention may be applied to desalination of sea water, desalination of brackish water, purification of various kinds of waste water, preparation of ultrapure water, ultrafiltration such as recovery of paint from waste water in electrodeposition painting, liquid permeation such as separation of para-xylene from a xylene mixture, gas permeation such as recovery of helium and purification of hydrogen, and the like. In any case, it is possible to carry out efficiently a large-scale treatment by using the apparatus of the present invention.

What is claimed is:

1. A hollow fiber membrane separation apparatus comprising a pressure vessel having one or more slide-in, replaceable hollow fiber membrane cartridges disposed longitudinally therein, (A) each said cartridge comprising a bundle of hollow fibers longitudinally aligned with said cartridge having at least one end of said bundle mounted in a tubesheet, said hollow fibers having selective permeability to fluid; an elongated feed member through which fluid to be treated can flow radially into and through the hollow fiber bundle; an elongated discharge member concentrically housed inside said elongated feed member; end caps mounted to the ends of said bundle wherein the facing ends of the tubesheet(s) and the adjacent end cap define a permeate collection space which is in fluid communication with (i) the open ends of the hollow fibers and (ii) said elongated discharge member; one or more of said end caps having a feed fluid port; wherein the feed member has a lip seal at said end cap; wherein the end caps are mounted over the ends of the bundle with epoxy; and (B) wherein the cartridges are disposed within the pressure vessel so as to form a first space between the outside of each bundle and the inner wall of the pressure vessel; a first opening at an end of the pressure vessel and offset from its center, which is in communication with the elongated feed member through which the fluid to be treated is fed; a second opening or openings at an end of the pressure container and concentric therewith, in fluid communication with the open end of hollow fibers through which the permeate is discharged; and a third opening at an end of the pressure vessel, opposite said end through which fluid to be treated is fed, and offset from the center, through which the residue fluid is discharged.

2. The separation apparatus of claim 1 wherein in any cartridge said hollow fibers have an inner diameter of about 20 microns to about 200 microns and a hollow ratio of about 10% to about 50%.

3. The separation apparatus of claim 2 wherein in any cartridge said hollow fibers have an inner diameter of about 40 microns and a hollow ratio of about 20%.

4. The separation apparatus of claim 1 containing 2 to 10 cartridges, wherein the cartridges are aligned in series.

5. The separation apparatus of claim 4 in which the cartridges are substantially identical in size and configuration.

6. The separation apparatus of claim 4 wherein each said cartridge additionally comprises an input bypass member to feed said fluid to be treated directly to one or more cartridges downstream within the apparatus.

7. The separation apparatus of claim 1 wherein the first opening is in fluid communication with said first space between the outside of the bundle and the inner wall of the pressure vessel and the elongated feed member, and wherein the relative flow of the feed fluid to said first space and said elongated feed member is regulated by a valve or orifice.

* * * * *